(12) United States Patent
Stancu et al.

(10) Patent No.: US 10,116,174 B2
(45) Date of Patent: Oct. 30, 2018

(54) SYNCHRONOUS RELUCTANCE ELECTRIC MACHINE

(71) Applicant: GM GLOBAL TECHNOLOGY OPERATIONS LLC, Detroit, MI (US)

(72) Inventors: Constantin C. Stancu, Auburn Hills, MI (US); Peter J. Savagian, Bloomfield Hills, MI (US); Khwaja M. Rahman, Troy, MI (US); Nitinkumar R. Patel, Oakland, MI (US); Robert T. Dawsey, Rochester Hills, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 181 days.

(21) Appl. No.: 15/145,916

(22) Filed: May 4, 2016

(65) Prior Publication Data

US 2017/0229928 A1    Aug. 10, 2017

Related U.S. Application Data

(60) Provisional application No. 62/291,872, filed on Feb. 5, 2016.

(51) Int. Cl.
| | |
|---|---|
| *H02K 21/12* | (2006.01) |
| *H02K 1/02* | (2006.01) |
| *H02K 1/24* | (2006.01) |
| *H02K 19/02* | (2006.01) |

(52) U.S. Cl.
CPC ............... *H02K 1/02* (2013.01); *H02K 1/246* (2013.01); *H02K 19/02* (2013.01)

(58) Field of Classification Search
CPC ......... H02K 21/24; H02K 1/2706; H02K 1/02
USPC ............. 310/156.48, 156.53, 156.56, 156.57
See application file for complete search history.

(56) References Cited

U.S. PATENT DOCUMENTS

| 5,831,367 | A | 11/1998 | Fei et al. | |
|---|---|---|---|---|
| 7,800,271 | B2 * | 9/2010 | Komuro | ............... H01F 41/0293 148/302 |
| 2004/0119365 | A1 * | 6/2004 | Breznak | .................... H02K 1/02 310/216.006 |
| 2010/0079025 | A1 * | 4/2010 | Suzuki | ..................... H02K 1/02 310/156.11 |
| 2013/0119816 | A1 * | 5/2013 | Yang | ..................... H02K 1/148 310/216.007 |

(Continued)

FOREIGN PATENT DOCUMENTS

| CN | 102497077 A | 6/2012 |
|---|---|---|
| CN | 103117608 A | 5/2013 |

(Continued)

*Primary Examiner* — Hanh Nguyen
(74) *Attorney, Agent, or Firm* — Quinn IP Law

(57) ABSTRACT

A synchronous reluctance electric machine is described, and includes a stator including a plurality of electrical windings and a rotor disposed in a cylindrically-shaped void formed within the stator. The rotor includes a plurality of steel laminations assembled onto a shaft, wherein the shaft defines a longitudinal axis. Each of the steel laminations includes a plurality of poles and each of the poles includes a plurality of slots disposed near an outer periphery. The slots of the steel laminations are longitudinally aligned. A plurality of packets assembled from anisotropic material are disposed in the slots.

18 Claims, 2 Drawing Sheets

(56) References Cited

U.S. PATENT DOCUMENTS

2013/0162089 A1* 6/2013 Komuro .................. H02K 1/02
310/156.01

FOREIGN PATENT DOCUMENTS

| CN | 204615530 U | 9/2015 |
| JP | H08256456 A | 10/1996 |

* cited by examiner

SYNCHRONOUS RELUCTANCE ELECTRIC MACHINE

CROSS-REFERENCE TO RELATED APPLICATIONS

This application claims the benefit of U.S. Provisional Patent Application No. 62/291,872 filed on Feb. 5, 2016, the disclosure of which is hereby incorporated by reference.

TECHNICAL FIELD

This disclosure relates to synchronous reluctance electric machines, and more specifically to a rotor assembly for such electric machines.

BACKGROUND

A reluctance electric machine generally includes a rotor that is rotatably disposed within a stator, wherein the stator generally includes a plurality of windings and magnetic poles of alternating polarity and the rotor is fabricated from steel or other ferrous material and preferably includes one or a plurality of inherent poles. The rotor is fabricated from ferromagnetic material such as soft iron. Torque is generated through the phenomenon of magnetic reluctance, wherein a controller controls the stator to generate a rotating magnetic field that induces a magnetic field in the rotor, and the interaction of these two magnetic fields produces torque on the rotor.

A synchronous reluctance electric machine may have an equal number of stator and rotor poles. The projections on the rotor can be arranged to introduce internal flux barriers, i.e., holes that direct the magnetic flux along a d-axis. Generally, the axis in the direction of greatest magnetic reluctance is referenced as a direct axis or d-axis, and the axis which is 90 degrees ahead of the direct axis is referenced as a quadrature axis or q-axis, which has the least magnetic reluctance. Pole numbers are known to be 4 and 6. When the spaces or notches between the rotor poles are opposed to the stator poles, the magnetic circuit of the electric machine has a low magnetic reluctance, but when the rotor poles are aligned with the stator poles, the magnetic circuit has a high magnetic reluctance. When a stator pole pair is energized, the nearest rotor pole pair will be pulled into alignment with the energized stator poles to minimize the reluctance path through the machine. Rotary motion is made possible by sequentially energizing the stator poles to cause the rotor to step to the next energized pole. The synchronous reluctance electric machine is designed to operate using an alternating current at a controlled frequency that is supplied to the stator windings. The rotor has a plurality of inherent poles to create a variable reluctance in the electric machine's magnetic circuit which depends on the angular position of the rotor. These inherent poles can be created by milling axial slots along the length of the rotor.

SUMMARY

A synchronous reluctance electric machine is described, and includes a stator including a plurality of electrical windings and a rotor disposed in a cylindrically-shaped void formed within the stator. The stator includes a plurality of steel laminations assembled onto a shaft, wherein the shaft defines a longitudinal axis. Each of the steel laminations includes a plurality of poles and each of the poles includes a plurality of slots disposed near an outer periphery. The slots of the steel laminations are longitudinally aligned. A plurality of packets assembled from anisotropic material are disposed in the slots.

The above features and advantages, and other features and advantages, of the present teachings are readily apparent from the following detailed description of some of the best modes and other embodiments for carrying out the present teachings, as defined in the appended claims, when taken in connection with the accompanying drawings.

BRIEF DESCRIPTION OF THE DRAWINGS

One or more embodiments will now be described, by way of example, with reference to the accompanying drawings, in which.

DETAILED DESCRIPTION

Figure 1:
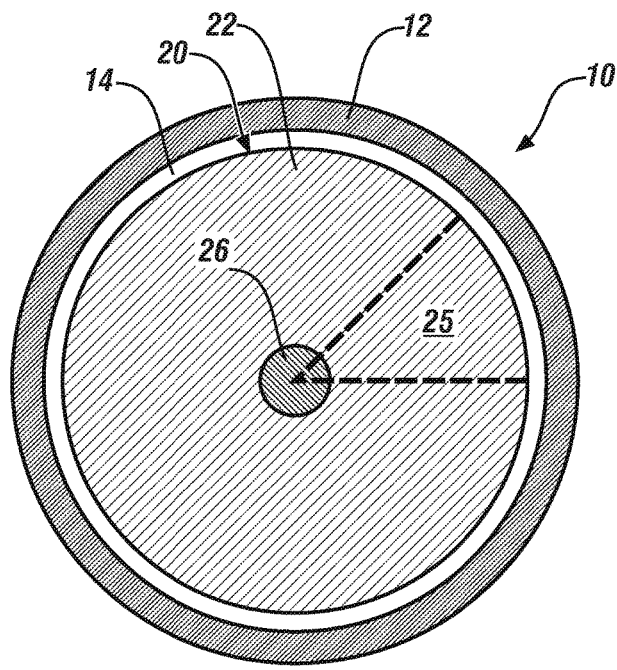
FIG. 1 schematically illustrates a cross-sectional view of a synchronous reluctance electric machine including an annular-shaped stator that forms a cylindrically-shaped void into which a coaxial rotor is inserted, in accordance with the disclosure.

Referring now to the drawings, wherein the depictions are for the purpose of illustrating certain exemplary embodiments only and not for the purpose of limiting the same, FIG. 1 schematically illustrates a cross-sectional view of a synchronous reluctance electric machine 10 including an annular-shaped stator 12 that forms a cylindrically-shaped void into which a coaxial rotor 20 is inserted, with an airgap 14 formed between the stator 12 and the rotor 20. The rotor 20 includes a rotatable shaft 26 having ends that extend through apertures formed in endcaps of the stator 12, with suitable mounting and bearing devices arranged therein. The shaft 26 defines a longitudinal axis with radial lines extending orthogonal to the longitudinal axis. The stator 12 houses a plurality of electrical windings (not shown) that are circumferentially arranged. The electrical windings are electrically connected to a suitable device, e.g., an inverter, which may be controlled by a controller to generate rotating electrical fields that induce magnetic fields adjacent to the rotor 20 to generate mechanical torque in the rotor 20. The electric machine 10 may be controlled to operate as a torque motor and/or an electric power generator. Overall operation of a synchronous reluctance electric machine 10 is known to those skilled in the art, and thus not described in detail herein.

Figure 2:
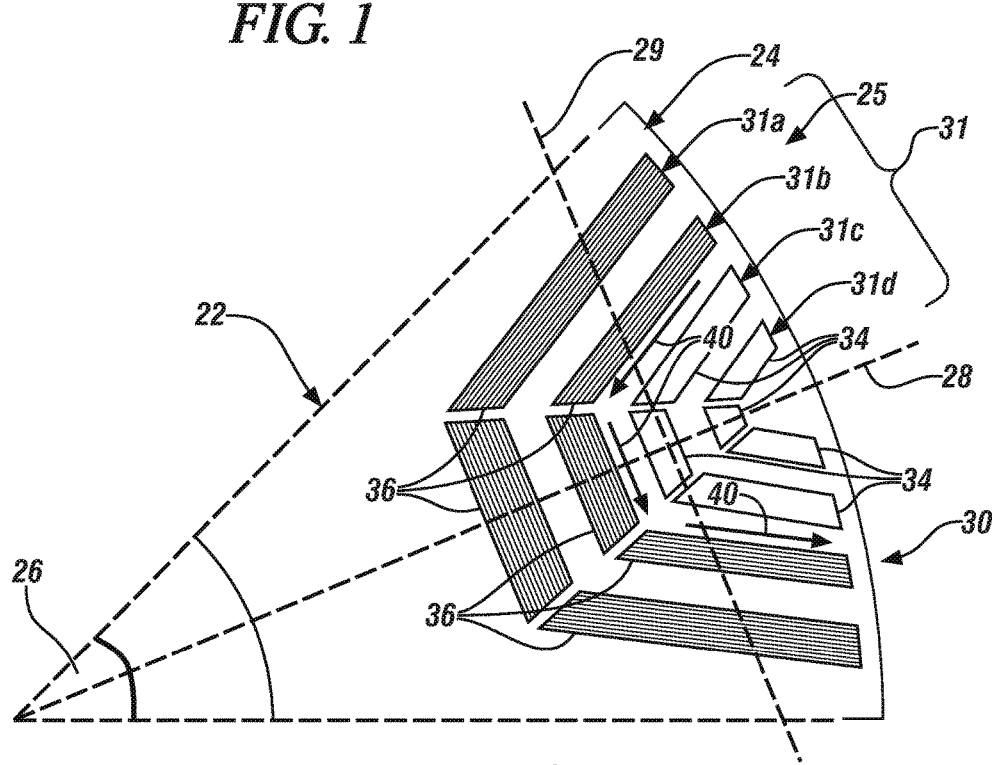
FIG. 2 schematically illustrates a cross-sectional view of a single pole portion of a single lamination of the synchronous reluctance electric machine described with reference to FIG. 1 including a pole arrangement including a plurality of slots that are disposed near an outer periphery thereof, wherein anisotropic packets are inserted into the slots, in accordance with the disclosure.

The rotor 20 is composed of a plurality of disc-shaped laminations 22 that are fabricated from isotropic steel or another ferromagnetic material such as compressed iron powder. The plurality of laminations are stacked and press-fit or otherwise fixedly assembled onto the shaft 26 to rotate in concert therewith. The rotor 20 includes a plurality of pole portions 25 that are circumferentially located about the rotor shaft 26, preferably at predetermined spacings that are identical. One pole portion 25 of a single lamination 22 is indicated with reference to FIG. 1 and is schematically shown in additional detail with reference to FIG. 2. Embodiments of the rotor 20 may have two pole portions 25, four pole portions 25, six pole portions 25, eight pole portions 25, or any other suitable quantity of pole portions 25.

The rotor 20 is preferably fabricated so that magnetic permeability is lower in the direction of a d-axis 28, i.e., increased reluctance, and greater in the direction of a q-axis 29, i.e., decreased reluctance. The principle of operation of reluctance machines is based on existence of variable reluctance in the air gap 14, low reluctance in the q-axis 29 direction and high reluctance in the d-axis 28 direction.

The pole portion 25 of the single lamination 22 of the rotor 20 includes a pole arrangement 30 including a plurality of slots 31, arranged in layers 31a, 31b, 31c and 31d as shown that are disposed near an outer periphery thereof, wherein the layers 31a, 31b, 31c and 31d are defined in relation to the outer periphery 24. Four layers are shown, but any quantity of layers may be employed. When the plurality of laminations 22 are assembled onto the shaft 26, the slots 31 are aligned and are arranged parallel to the longitudinal axis defined by the shaft 26.

Each of the pole arrangements 30 defines the d-axis 28 and the q-axis 29, wherein the d-axis 28 is aligned with the center of the magnetic pole and the q-axis 29 is orthogonal to the d-axis 28 and aligned with a mid-point of two magnetic poles of the rotor. The d-axis 28 indicates an orientation having the lowest inductance, and the q-axis 29 indicates an orientation having the greatest inductance. As such, there is a d-axis 28 and a q-axis 29 associated with each of the pole arrangements 30.

A saliency ratio is defined as follows:

$$\xi_r = L_q/L_d$$

wherein
$\xi_r$ is the saliency ratio,
$L_d$ is the inductance along the d-axis 28, and
$L_q$ is the inductance along the q-axis 29.

As known to those skilled in the art, performance of a synchronous reluctance electric machine improves with increased saliency ratio.

Anisotropic packets 36 are inserted into the slots 31. A face portion 38 of one of the anisotropic packets 36 is identified, and indicates that portion of the anisotropic packet 36 that is visible on either end of the rotor 20. All of the slots associated with each layer 31a, 31b, 31c and 31d may be void 34, or all the slots associated with one or more of the layers 31a, 31b, 31c and 31d may contain an anisotropic packet 36. As shown, the slots 31 of layers 31a and 31b remain void 34, and the slots 31 of layers 31c and 31d contain anisotropic packets 36.

Figure 3:
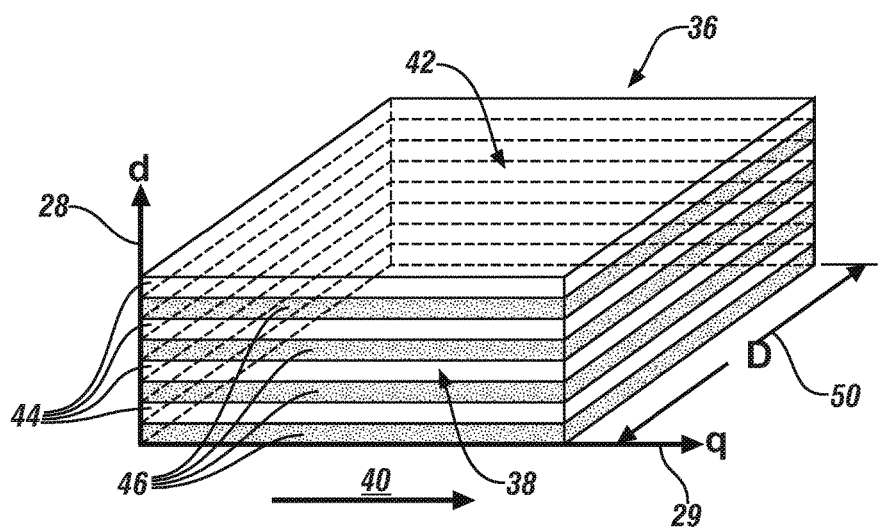
FIG. 3 schematically shows a perspective view of a first embodiment of the anisotropic packet, which includes a lamination stack composed of a plurality of anisotropic laminations having interspersed non-magnetic spacers, in accordance with the disclosure.

FIG. 3 schematically shows a first embodiment of the anisotropic packet 36, which includes a lamination stack 42 composed of a plurality of anisotropic laminations 44 having interspersed non-magnetic spacers 46. The face portion 38 of the anisotropic packet 36 and a lamination rolling direction 40 are indicated wherein the anisotropic laminations 44 are layered axially. An anisotropic material is a material that exhibits unequal physical properties along different axes. The anisotropic laminations 44 described herein preferably exhibit magnetic properties related to core loss and induction permeability that change depending upon the rolling direction of the material when it is processed. Specifically, the anisotropic laminations 44 described herein preferably exhibit a reduced core loss and increased induction permeability in the rolling direction as compared to orthogonal directions of the material. The plurality of anisotropic laminations 44 may be fabricated from a grain-oriented steel material in one embodiment. In one embodiment, the grain-oriented steel material includes an iron-silicon magnetic alloy that is processed by cold rolling, which serves to achieve the preferred magnetic properties related to core loss and induction permeability. Alternatively, the plurality of anisotropic laminations 44 may be fabricated from an amorphous metal alloy that is formed employing a rapid solidification process.

The lamination rolling direction 40 is indicated for the plurality of anisotropic laminations 44, as are the preferred predominant d-axis 28 and q-axis 29 of the rotor 20 when the anisotropic packet 36 is inserted into the rotor 20. The non-magnetic spacers 46 may be fabricated by oxide deposition onto surfaces of the anisotropic laminations 44, or may be fabricated from aluminum or alumina, or include both, depending on thickness required. The thicknesses of the anisotropic packets 36 and the non-magnetic spacers 46 are preferably determined using motor simulation under simulated motor load conditions, taking into account magnetic properties, permeability, temperature, torque generation, and other factors. A depth 50 of the anisotropic packet 36 is also shown, and indicates the length that the anisotropic packet 36 projects into the slot 31 of the rotor 20. Preferably, and as shown the axis of low magnetic reluctance of the anisotropic packet 36 is aligned with the q-axis 29 of the rotor 20, which corresponds to the cold rolling direction 40 for the plurality of anisotropic laminations 44. The depth 50 of the anisotropic packet 36 may be limited in order to reduce eddy current loss and facilitate insertion.

Figure 4:
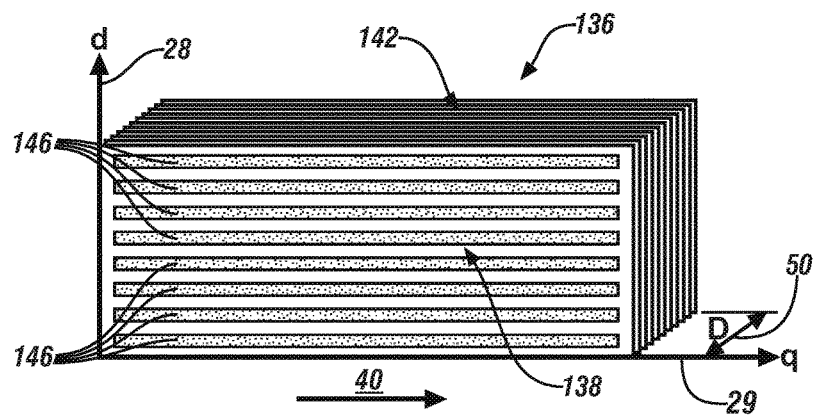
FIG. 4 schematically shows a perspective view of a second embodiment of the anisotropic packet, which includes a lamination stack composed of a plurality of anisotropic laminations, each having a plurality of voids that function as flux barriers, in accordance with the disclosure.

FIG. 4 schematically shows a second embodiment of the anisotropic packet 136, which includes a lamination stack 142 composed of a plurality of anisotropic laminations 144, each having a plurality of voids 146 that function as flux barriers wherein the anisotropic laminations 144 are layered radially. The voids 146 may be fabricated using any suitable technology, e.g., stamping or laser cutting. Each of the anisotropic laminations 144 has a planar surface into which the voids 146 are fabricated. The planar surfaces of the stacked anisotropic laminations 144 have shapes that are analogous to a cross-sectional shape of at least a portion of the associated slot 31 of the rotor 20 into which the anisotropic packet 136 is assembled. A face portion 138 of one of the anisotropic packets 136 is identified, and indicates that portion of the anisotropic packet 136 that is visible on either end of the rotor 20.

Each of the plurality of anisotropic laminations 144 is preferably fabricated from a grain-oriented steel material. In one embodiment, the grain-oriented steel material includes an iron-silicon magnetic alloy that is processed by cold rolling, which serves to achieve preferred magnetic properties related to core loss and permeability in the rolling direction. Alternatively, the plurality of anisotropic laminations 144 may be fabricated from an amorphous metal alloy that is formed employing a rapid solidification process.

The lamination rolling direction 40 is indicated for the plurality of anisotropic laminations 144, as are the preferred predominant d-axis 28 and q-axis 29 of the rotor 20 when the anisotropic packet 136 is inserted into the rotor 20. A depth 50 of the anisotropic packet 136 is also shown, and indicates the length that the anisotropic packet 136 projects into the slot 31 of the rotor 20. Preferably, and as shown the q-axis 29 of the rotor 20 is aligned with the axis of low magnetic reluctance of the anisotropic packet 136, which corresponds to the cold rolling direction 40 for the plurality of anisotropic laminations 144. As such, this embodiment of the anisotropic packet 136 includes a lamination stack 142 composed of a plurality of anisotropic laminations 144, each having a plurality of voids 146 that function as flux barriers, with a q-axis 29 of the rotor aligned with the axis of low magnetic reluctance, which corresponds to the cold rolling direction for the material. No spacer is required between the individual anisotropic laminations 144. However, the end portion of the lamination stack 142 presents no barriers in the path of the d-axis flux. This leakage path is in the direction of low material permeance, perpendicular on the rolling direction, so leakage will be relatively low.

Figure 5:
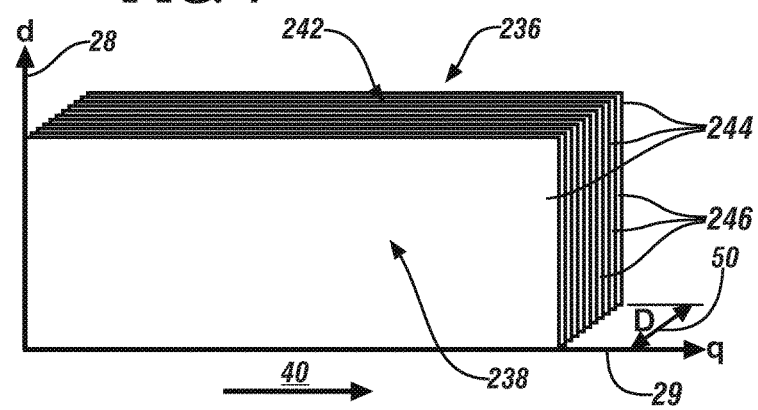
FIG. 5 schematically shows a perspective view of a third embodiment of the anisotropic packet, which includes a lamination stack composed of a plurality of anisotropic laminations, in accordance with the disclosure.

FIG. 5 schematically shows a third embodiment of the anisotropic packet 236, which includes a lamination stack 242 composed of a plurality of anisotropic laminations 244. A face portion 238 of the anisotropic packet 236 is identified, and indicates that portion of the anisotropic packet 236 that is visible on either end of the rotor 20. Each of the anisotropic laminations 244 has a planar surface having a shape that is analogous to a cross-sectional shape of at least a portion of the associated slot 31 of the rotor 20 into which the anisotropic packet 236 is assembled. Each of the plurality of anisotropic laminations 244 is preferably fabricated from a grain-oriented steel material. In one embodiment, the grain-oriented steel material includes an iron-silicon magnetic alloy that is processed by cold rolling, which serves to achieve preferred magnetic properties related to permeability in the rolling direction. Alternatively, the plurality of anisotropic laminations 244 may be fabricated from an amorphous metal alloy that is formed employing a rapid solidification process.

The lamination rolling direction 40 is indicated for the plurality of anisotropic laminations 244, as are the preferred predominant d-axis 28 and q-axis 29 of the rotor 20 when the anisotropic packet 236 is inserted into the rotor 20. A depth 50 of the anisotropic packet 236 is also shown, and indicates the length that the anisotropic packet 236 projects into the slot 31 of the rotor 20. Preferably, and as shown the q-axis 29 of the rotor 20 is aligned with the axis of low magnetic reluctance of the anisotropic packet 236, which corresponds to the cold rolling direction 40 for the plurality of anisotropic laminations 244.

This disclosure improves rotor saliency of a synchronous reluctance rotor. Alternatively, motor performance in the form of motor torque-per-ampere and efficiency may be improved. Furthermore, there may be improved saliency of an embodiment of a synchronous reluctance electric machine due to the use of grain-oriented steel laminations that are axially inserted in the rotor slots. The grain-oriented steel laminations are placed axially in the rotor slots of radial lamination resulting in a hybrid structure with axial and radial laminations. A high saliency ratio ($L_q \gg L_d$) may increase torque production and improve motor efficiency. Increased saliency also improves high speed performance of the electric machine. The increase in rotor saliency is achieved by increasing the q-axis inductance by the axial insertion of grain oriented lamination, while keeping the d-axis inductance unaffected. The use of the radial lamination and axial lamination packets facilitate higher pole counts and thus higher speed operation, increased torque per ampere and increased peak motor torque to achieve similar performance.

As used in this specification and claims, the terms "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation.

It should be understood that while the use of words such as preferable, preferably, preferred or more preferred utilized in the description above indicate that the feature so described may be more desirable, it nonetheless may not be necessary and embodiments lacking the same may be contemplated as within the scope of the disclosure, the scope being defined by the claims that follow.

In reading the claims, it is intended that when words such as "a," "an," "at least one," or "at least one portion" are used there is no intention to limit the claim to only one item unless specifically stated to the contrary in the claim.

The detailed description and the drawings or figures are supportive and descriptive of the present teachings, but the scope of the present teachings is defined solely by the claims. While some of the best modes and other embodiments for carrying out the present teachings have been described in detail, various alternative designs and embodiments exist for practicing the present teachings defined in the appended claims.

The invention claimed is:

1. A synchronous reluctance electric machine, comprising:
   a stator including a plurality of electrical windings;
   a rotor disposed in a cylindrically-shaped void formed within the stator and including a plurality of steel laminations assembled onto a shaft,
      wherein the shaft defines a longitudinal axis,
      wherein each of the steel laminations includes a plurality of poles and wherein each of the poles includes a plurality of slots disposed near an outer periphery, and
      wherein the slots of the steel laminations are longitudinally aligned; and
   a plurality of packets assembled from anisotropic material and disposed in the slots, wherein each of the packets assembled from anisotropic material comprises a stack including a plurality of laminations fabricated from a grain-oriented steel material, wherein the grain-oriented steel material of the plurality of laminations are aligned along a common axis.

2. The synchronous reluctance electric machine of claim 1, wherein the plurality of packets assembled from anisotropic material are disposed in the slots in an axial orientation relative to the longitudinal axis.

3. The synchronous reluctance electric machine of claim 1, wherein the common axis associated with the grain-oriented steel materials of the plurality of laminations is parallel with a d-axis associated with one of the poles of the rotor.

4. The synchronous reluctance electric machine of claim 1, wherein the common axis associated with the grain-oriented steel materials of the plurality of laminations is aligned with an axis of low magnetic reluctance associated with one of the poles of the rotor.

5. The synchronous reluctance electric machine of claim 1, wherein the plurality of laminations fabricated from a grain-oriented steel material are layered radially.

6. The synchronous reluctance electric machine of claim 1, wherein the plurality of laminations fabricated from a grain-oriented steel material are layered axially.

7. The synchronous reluctance electric machine of claim 1, wherein the grain-oriented steel material comprises an iron-silicon magnetic alloy.

8. The synchronous reluctance electric machine of claim 1, wherein each of the steel laminations comprises a disc-shaped steel lamination.

9. The synchronous reluctance electric machine of claim 8, wherein each of the disc-shaped steel laminations are fabricated from an isotropic material.

10. A rotor for a synchronous reluctance electric machine, the rotor comprising:
a plurality of steel laminations assembled onto a shaft, wherein the shaft defines a longitudinal axis;
each of the steel laminations including a plurality of poles;
each of the poles including a plurality of slots disposed near an outer periphery, wherein the slots of the steel laminations are longitudinally aligned; and
a plurality of packets assembled from anisotropic material and disposed in the slots, wherein each of the packets assembled from anisotropic material comprises a stack including a plurality of laminations fabricated from a grain-oriented steel material, wherein the grain-oriented steel material of the plurality of laminations are aligned along a common axis.

11. The rotor of claim 10, wherein the plurality of packets assembled from anisotropic material are disposed in the slots in an axial orientation relative to the longitudinal axis.

12. The rotor of claim 10, wherein the common axis associated with the grain-oriented steel materials of the plurality of laminations is parallel with a d-axis associated with one of the poles of the rotor.

13. The rotor of claim 10, wherein the common axis associated with the grain-oriented steel materials of the plurality of laminations is aligned with an axis of low magnetic reluctance associated with one of the poles of the rotor.

14. The rotor of claim 10, wherein the plurality of laminations fabricated from a grain-oriented steel material are layered radially.

15. The rotor of claim 10, wherein the plurality of laminations fabricated from a grain-oriented steel material are layered axially.

16. The rotor of claim 10, wherein the grain-oriented steel material comprises an iron-silicon magnetic alloy.

17. The rotor of claim 10, wherein each of the steel laminations comprises a disc-shaped steel lamination.

18. The rotor of claim 17, wherein each of the disc-shaped steel laminations are fabricated from an isotropic material.

* * * * *